(12) United States Patent
Yano et al.

(10) Patent No.: US 6,481,545 B1
(45) Date of Patent: Nov. 19, 2002

(54) VIBRATION DAMPING SHIM STRUCTURE

(75) Inventors: Kunihiko Yano, Kawagoe (JP); Takahiro Niwa, Tokyo (JP); Masaki Yoshihara, Kashiba (JP); Tadashi Arai, Ikaruga-cho (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 10/103,585

(22) Filed: Mar. 21, 2002

(30) Foreign Application Priority Data

Mar. 30, 2001 (JP) ........................................ 2001-099136

(51) Int. Cl.[7] .............................................. F16D 65/78
(52) U.S. Cl. ................................ 188/264 G; 188/73.37; 188/73.35
(58) Field of Search .................... 188/264 G, 251 A, 188/73.37, 73.36, 73.35, 250 E, 250 B, 250 A, 73.1, 250 G, 256, 258, 250 H

(56) References Cited

U.S. PATENT DOCUMENTS

| | | | | |
|---|---|---|---|---|
| 3,966,026 A | * | 6/1976 | Filderman | 188/250 B |
| 4,103,761 A | * | 8/1978 | Filderman | 188/250 B |
| 4,373,615 A | * | 2/1983 | Melinat | 188/250 B |
| 5,099,962 A | * | 3/1992 | Furusu et al. | 188/251 A |
| 5,762,166 A | * | 6/1998 | Yano et al. | 188/250 E |
| 6,213,257 B1 | * | 4/2001 | Yano et al. | 188/250 E |

OTHER PUBLICATIONS

Japanese Publication No. Sho 62–45436.
Japanese Publication No. Hei 4–3136.
Japanese Publication No. Hei 8–232998.

* cited by examiner

*Primary Examiner*—Pam Rodriguez
*Assistant Examiner*—Melanie Torres
(74) *Attorney, Agent, or Firm*—Flynn, Thiel, Boutell & Tanis, P.C.

(57) ABSTRACT

A vibration damping shim structure is provided, which not only can sufficiently exert vibration damping effect in a wide range of temperatures, but also can prevent a squeal phenomenon particularly in low temperatures.

A rubber coating layer $a_1$ is formed on one side of a first constraint plate $a_2$ of a metallic plate and a second constraint plate $a_4$ is stuck to the other side of the first constraint plate $a_2$ with a adhesive layer $a_3$ placed in-between. The ratio of the thickness of the first constraint plate $a_2$ to a sum total of the thickness of the back plate $b_1$ forming a disc brake B and the second constraint plate $a_4$ is taken as within 0.1 to 0.2, and the second constraint plate $a_4$ is used so as to be brought into contact with the back plate $b_1$.

3 Claims, 3 Drawing Sheets

VIBRATION DAMPING SHIM STRUCTURE

BACKGROUND OF THE INVENTION

1. Field of the Invention

The present invention relates to a vibration damping shim structure for use of a disc brake of an automobile and, more in particular, to the vibration damping shim structure reducing a high frequency noise (referred to as a squeal phenomenon), which is generated at braking.

2. Description of the Related Art

A conventional vibration damping shim structure for disc brake squealing prevention will be described.

FIGS. 2 to 3 shows a shim structure disclosed in Japanese Utility Model Application Laid-Open No. 62-45436.

A shim 60 which is disclosed in this official gazette has a stainless steel plate 62 and a metallic thin plate 66 coated with a heat-resistant and oil proof rubber 64 laminated toward the pressing direction (the direction of an arrow $P_2$ of FIG. 2) of a caliper claw 68. The stainless steel plate 62 is arranged on the side of caliper claw 68 and, as shown in FIG. 3, a plurality of claws 70 is formed on its periphery. This claw 70 is constituted so that it is fitted to a back metal 72 of a brake pad. On the other hand, the thin plate 66 coated with the rubber 64 is arranged on the side of the back metal 72 and grease 74 is coated on an upper surface of the rubber 64. As shown in FIG. 3, a plurality of notches and a grease pool 76 constituted by an oblong hole are formed on the thin plate 66. The coated grease 74 is accumulated in this grease pool 76. A claw 78 is formed on the periphery of the thin plate 66 similarly to the stainless steel plate 62 and is constituted so that it is fitted to the back plate 72.

That is, as shown in FIG. 2, the shim 60 of the above constitution forms a six layer structure of the stainless steel sheet 62, the grease 74, the rubber 64, the thin plate 66, the rubber 64 and the grease 74, which is directed toward the pressing direction of the caliper claw 68.

The shim 60 of the above-described constitution can stop the vibration which is the cause of the "squealing noise" by a vibration insulating operation by interposing the rubber 64 or the grease 74 between the caliper claw 68 and the back metal 72. Further, the vibration which is not stopped but propagated can be damped by a damping operation by a damping action attributable to an internal friction of the rubber 64 and a damping action attributable to a sliding friction of the grease 74. Further, a relative displacement is generated between the back metal 72 (that is, the brake pad) and the shim 60 by the grease 74 coated between the back metal 72 and the thin plate 66 and the rubber 64 covered on the thin plate 66. By frictional damping generated by this relative displacement, the vibration can be dampened. Further, the relative displacement is generated between the brake pad and the shim 60, so that the constraint condition of the brake pad by the caliper claw 68 is changed. For this reason, the generation of the vibration can be reduced.

FIG. 4 shows a shim structure disclosed in Japanese Utility Model Application Laid-Open No. 4-3136.

A silicon gel layer 92 is provided in the center portion of a shim 90 which is disclosed in the official gazette. An adhesive layer 96 comprising an adhesive, an adhesive film and the like is formed on the side of the caliper claw 94 of the silicon gel layer 92. A steel sheet 98 is arranged on the side of the caliper claw 94 of the adhesive layer 96, and the steel sheet 98 is integrally bonded to the silicon gel layer 92 by the adhesive layer 96.

On the other hand, similarly an adhesive layer 102 is formed on the side of a back metal 100 of the brake pad of the silicon gel layer 92. A steel sheet 104 is arranged on the side of the back metal 100 of the adhesive layer 102, and the steel sheet 104 is integrally bonded to the silicon gel layer 92 by the adhesive layer 102. Further, an adhesive layer 106 comprising the adhesive, the adhesive film and the like is formed on the side of the back metal 100 of the steel sheet 104, and the steel sheet 104 is bonded to the back metal 100 by the adhesive layer 106.

That is, as shown in FIG. 4, the shim 90 of the constitution forms a six layer structure of the steel sheet 98, the adhesive layer 96, the silicon gel layer 92, the adhesive layer 102, the steel sheet 104 and the adhesive layer 106, which is directed toward the pressing direction (the direction of the arrow $p_3$ of FIG. 4) of the caliper claw 94 as shown in the sectional view, and the shim 90 is integrally attached to the back metal 100.

The silicon gel layer 92 having a good vibration insulating and flexibility is interposed in the center of the shim 90 of the constitution, whereby the shim prevents propagation of the vibration which is the cause of a "brake squealing" by both actions of the vibration insulating action and the damping action of the silicon gel layer 92.

However, the shim structure of the conventional constitution is unable to obtain a sufficient "brake squealing" prevention effect as yet. That is, since the grease 74 is coated on the surface of the rubber 64 of the shim 60 in FIGS. 2 to 3, the relative displacement of the brake pad is expedited. For this reason, the effect by the friction damping and the vibration reducing action by a change in the constraint condition of the brake pad are excellent. However, since the damping action and the vibration insulating action are inferior to the silicon gel layer 92 of the shim 90 of FIG. 4, the "brake squealing" cannot be sufficiently prevented.

The shim 90 of FIG. 4 comprises the silicon gel layer 92, which is excellent in vibration insulating and, therefore, the effect by the damping action and the effect by the vibration insulating action are excellent. However, since the shim 90 and the back metal 100 of the brake pad are bonded, the relative displacement of the brake pad is small, and the effect by the frictional damping and the effect by the change of the constraint condition are poor. For this reason, the "brake squealing" cannot be sufficiently prevented.

In this way, either one of the conventional shims such as the shim 60 of FIG. 2 and the shim 90 of FIG. 4 is partially limited in the effect of preventing the "brake squealing", and the "brake squealing" cannot be sufficiently prevented so that the countermeasure to meet the situation has been earnestly desired.

SUMMARY OF THE INVENTION

In order to solve the problem, a shim structure shown in FIGS. 5 and 6 (Japanese Patent Application Laid-Open No. 8-232998) has been proposed.

In the same drawings, a shim 10 is constituted by a rubber 36 as high frictional means having elasticity, a vibration damping steel plate 38 as damping means and a grease 40 as low frictional means having viscosity and fluidity.

To describe more in detail, the vibration damping steel plate 38 is arranged in the center of the shim 10. The vibration damping steel plate 38 comprises a steel plate 44 consist of stainless and the like arranged at the side of the caliper claw 20 and a steel plate 46 consist of the same material as the steel plate 44 arranged at the side of the back metal 22. The steel plate 44 and the steel plate 46 are arranged mutually in parallel, and a viscous member consists of acryl and the like is provided between the steel plate 44 and the steel plate 46. The steel plate 44, the viscous member 42 and the steel plate 46 are adhered and integrally formed. The surface at the side of the caliper claw 20 of the steel plate 44 is coated with a rubber 36. On the other hand, on the surface at the side of the back metal 22 of the steel plate 46, a plurality of grease pools 48 opened toward the pressing direction (the direction of the arrow $P_1$ of FIG. 2) of the caliper claw 20 is formed. Further, on the surface of the side of the back metal 22 of the steel plate 46, grease 40 is coated and a part of this grease 40 is accumulated in the grease pools 48.

That is, the shim 10 of the constitution forms a five layer structure of the rubber 36, the steel plate 44, the viscous member 42, the steel plate 46 and the grease 40, which is directed toward the pressing direction (the direction of the arrow $P_1$ of FIG. 1) of the caliper claw 20 as shown in the sectional view.

The shim structure can reduce the vibration by the change of the frictional damping and the constraint condition of the vibration damping member.

However, there is a problem, which cannot be solved even in the shim of this structure. The problem is that, under the condition of low temperatures in the morning when the automobile begins to move, the squeal phenomenon generated at the braking cannot be reduced.

Nowadays when weight reduction of the automobile is desired, there is a general tendency to reduce even the weight of the back plate among the increasing demand for weight reduction of the parts.

Accompanied with this tendency, the squeal phenomenon generated at the low temperature time as described above has a tendency to remarkably increase.

The present invention aims to obtain a shim structure which can sufficiently exert the vibration damping effect in a wide temperature range.

The present invention is constituted in such a manner that a rubber coating layer is formed on one side of a first constraint plate of a metallic plate and a second constraint plate is stuck to the other side of the first constraint plate with a adhesive layer placed in-between. The ratio of thickness of the first constraint plate to a sum total of the thickness of the back plate of the disc brake pad and the second constraint plate of the automobile is taken as within 0.1 to 0.2, and the second constraint plate is used so as to be brought into contact with the back plate.

DESCRIPTION OF THE PREFERRED EMBODIMENTS

Figure 1:
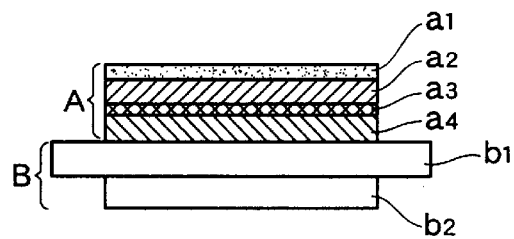
FIG. 1 is a typical sectional view of a vibration damping shim structure showing one embodiment of the present invention.
Figure 2:
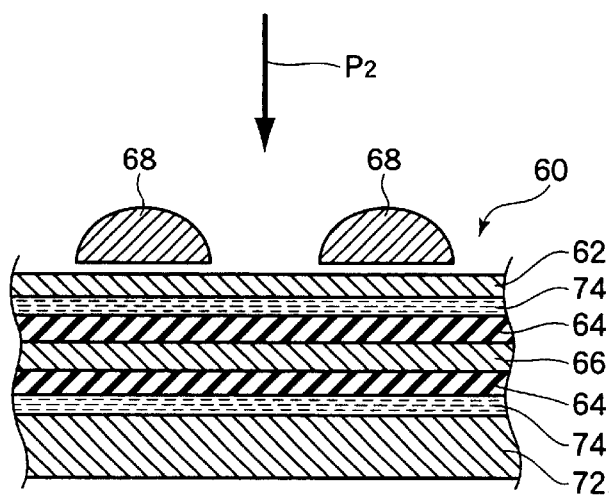
FIG. 2 is a sectional view showing one Embodiment of a conventional vibration damping shim structure.
Figure 3:
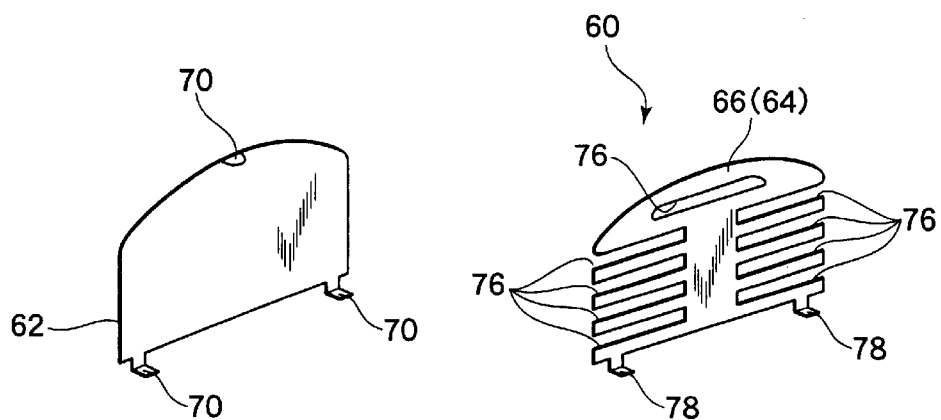
FIG. 3 is a perspective view of members constituting the vibration damping shim structure.
Figure 4:
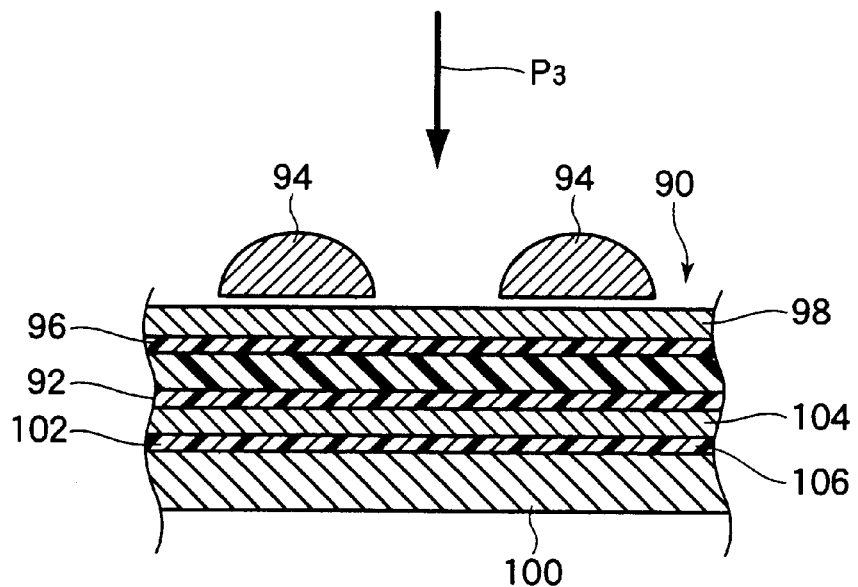
FIG. 4 is a sectional view showing another Embodiment of the conventional vibration damping shim structure.
Figure 5:
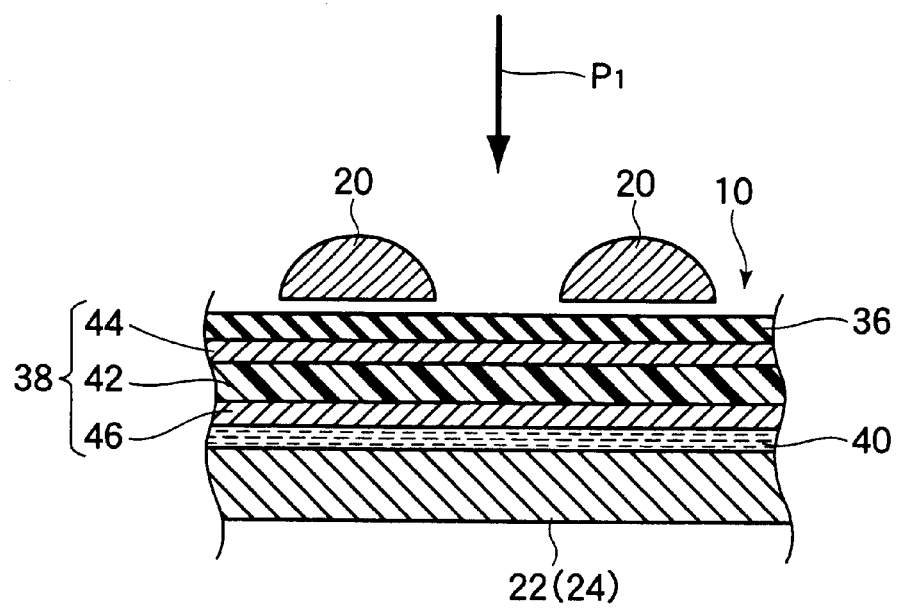
FIG. 5 is a sectional view showing another Embodiment of the conventional vibration damping shim structure.
Figure 6:
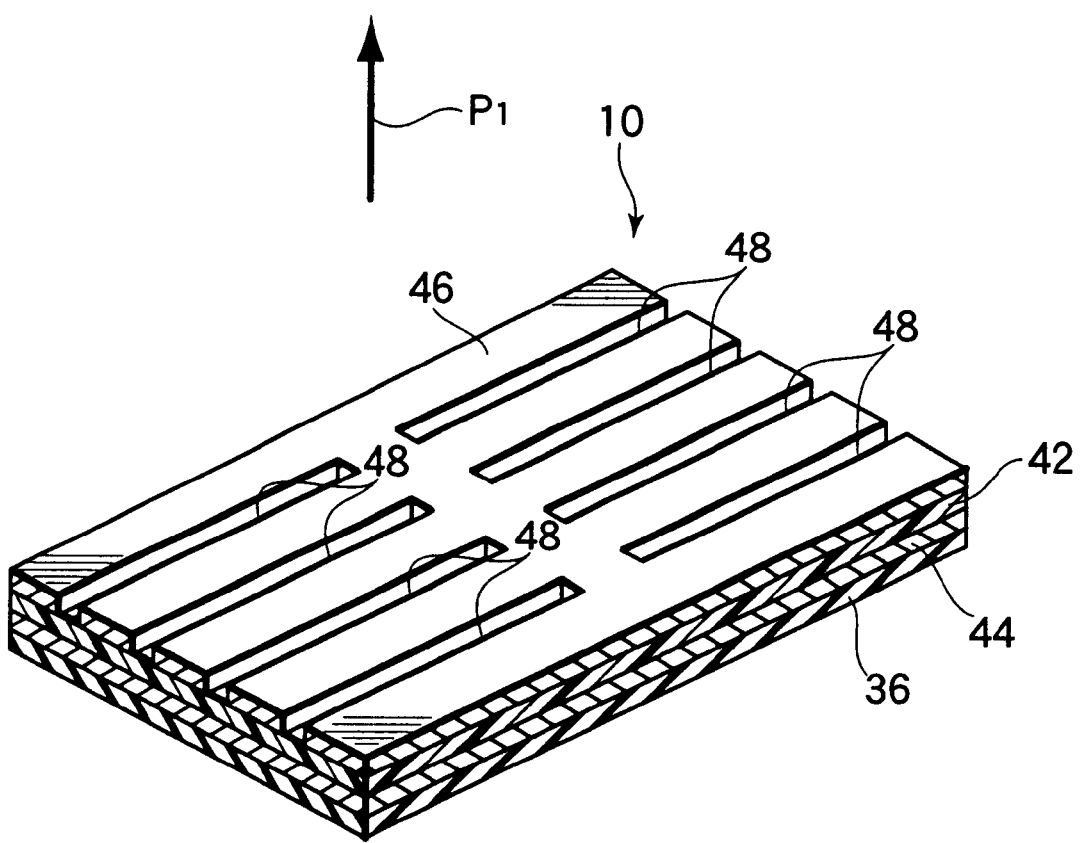
FIG. 6 is a perspective view of the vibration damping shim structure.

The form of the present embodiment is constituted in such a manner that, as shown in FIG. 1, a rubber coating layer $a_1$ is formed on one side of a first constraint plate $a_2$ of a metallic plate and a second constraint plate $a_4$ is stuck to the other side of the first constraint plate $a_2$ with a adhesive layer $a_3$ placed in-between. The ratio of the thickness of the first constraint plate $a_2$ to a sum total of the thickness of the back plate $b_1$ of the disc brake pad and the second constraint plate $a_4$ of the automobile is taken as within 0.1 to 0.2, and the second constraint plate $a_4$ is used so as to be brought into contact with the back plate $b_1$.

According to the constitution, the vibration is reduced by a multiplier action with the damping action by the friction between the second constraint plate $a_4$ and back plate $b_1$, the vibration insulating action by the adhesive layer $a_3$ between the second constraint plate $a_4$ and the first constraint plate $a_2$ the damping action by the internal friction and, further, the damping action by elasticity of the rubber.

Further, according to the constitution, all between the back plate $b_1$ and the second constraint plate $a_4$ operate as one body, and the second constraint plate $a_4$ and the back plate $b_1$ are related so as to be integrated for the first constraint plate $a_2$, and in the form where the first constraint plate $a_2$ and (the second constraint plate $a_4$+the back plate $b_1$) exist via the adhesive layer $a_3$, the ratio of the thickness of the first constraint plate $a_2$ to the second constraint plate $a_4$+the back plate $b_1$ is taken as within a range of 0.1 to 0.2, so that improvement of the squealing prevention effect is remarkably recognized.

This improvement of the squealing prevention effect can be considered as follows:

(1) By making a board thickness of the first constraint plate thicker, the thickness is brought near the thickness of (the second constraint plate+the back plate), thereby improving a vibration damping performance.

(2) With respect to the squealing due to resonance of a rotor and a pad, by making a board thickness of the first constraint plate thicker, an natural frequency of the pad attached to the shim is lowered so that the resonance of the rotor and the pad is prevented and the generation of the squealing is prevented.

(3) By making a board thickness of the first constraint plate thicker, mechanical strength of the shim is improved so that a brake system can be strong enough to endure rigorous braking.

(4) By making a board thickness of the first constraint plate thicker, it is possible to change inherent vibration frequency of the pad so that resonance frequency of the squealing at the pad can be shifted.

(5) When an adhesive having a glass transition point at most −25° C. is used, vibration damping properties at low temperatures (0 to 10° C.) are improved.

(6) The shim structure whose vibration damping performance was improved at such low temperatures is very effective in preventing the squealing generated when the temperatures are low.

(7) The temperatures being limited within such a range, it is possible to make workability, productivity and operationality excellent.

FIG. 1 is a sectional view typically showing a structure of a brake pad vibration damping shim structure according to the present invention, which shows a state of a vibration damping shim structure A being arranged on the surface of a back plate $b_1$ forming a brake pad B.

Reference numeral $a_1$ forms a rubber coating layer, $a_2$ a first constraint plate, $a_3$ an adhesive layer, $a_4$ a second constraint layer, and $b_2$ a frictional member forming a brake pad B.

As for the constraint plates $a_2$, $a_4$ which constitute the shim structure A, for Embodiment, a metallic plate such as an iron plate (steel cold rolled plate), an aluminum plate, a stainless plate, a copper plate and the like can be enumerated. The constraint plates include those treated with coating on the surface of the metallic plates for the purpose of rust prevention, corrosion prevention and the like.

On the other hand, as for the rubber material to be used for the rubber coating layer $a_1$, NBR (acrylonitrile-butadiene rubber), SBR (styrene-butadiene rubber), IR (isoprene rubber), BR (butadiene rubber), CR (chloroprene rubber), IIR (butyl rubber), EPM (ethylene-propylene rubber), EDDM (ethylene-propylene rubber), FKM (fluororubber) and the like can be enumerated. Particularly, in order to obtain a good intimacy, the hardness of the rubber coating layer is at most 90, or preferably at most 70 at durometer hardness A.

As for the adhesive of the adhesive layer $a_3$, acryl, rubber, silicon and the like can be enumerated and, for the practical purpose, use of acryl (cross linking type) pressure-sensitive type adhesive is preferable.

Among acryl adhesives, particularly those having a glass transition point (Tg) at most $-25°$ C. are effective to improve vibration damping at low temperatures. In the following embodiments, the adhesive having the Tg at most $-31°$ C. is used.

Bubbles may be included in the adhesive. In order to include bubbles in the adhesive, there are methods of automatically mixing bubbles by agitating the adhesive, mixing a blowing agent in the adhesive so as to allow it to bubble by generating pyrolytic gas, thermally expanding a microcapsule, coating the adhesive on a porous surface and allowing the adhesive on the porous surface to bubble by heating and the like. Porosity as the bubble contained adhesive is preferred to be within a range of 5 to 80% and a poro-size 10 to 300 $\mu$m.

Next, practical embodiments of the present invention will be described.

Embodiment (1)

The vibration damping shim structure shown in FIG. 1 was fabricated by the following materials and thickness:

A steel cold rolled plate $a_2$ having a thickness of 0.8 mm, a rubber coating layer $a_1$ having a thickness of 0.1 mm, a acryl pressure sensitive adhesive layer $a_3$ having a thickness of 0.1 mm, a stainless plate $a_4$ having a thickness of 0.4 mm and a back plate $b_1$ having a thickness of 6 mm.

Embodiment (2)

The thickness of the steel cold rolled plate $a_2$ is made 0.6 mm by using the material of the embodiment (1) and, with other materials having the same structure as the embodiment (1), the vibration damping shim structure was fabricated.

Embodiment (3)

The thickness of the steel cold rolled plate $a_2$ is made 0.9 mm by using the material of the embodiment (1) and, with other materials having the same structure as the embodiment (1), the vibration damping shim structure was fabricated.

Comparative Embodiment (1)

The thickness of the steel cold rolled plate $a_2$ is made 0.5 mm by using the material of the embodiment (1) and, with other materials having the same structure as the embodiment (1), the vibration damping shim structure was fabricated.

Comparative Embodiment (2)

The thickness of the steel cold rolled plate 10 is made 0.4 mm by using the material of the embodiment (1) and, with other materials having the same structure as the embodiment (1), the vibration damping shim structure was fabricated.

With respect to the embodiments (1) to (3) and the comparative Embodiments (1), (2), the brake squealing prevention performance of the vibration damping shim structure was measured by using a brake squealing dynamo tester in a temperature of $5°$ C. The result is shown in the following Table 1.

TABLE 1

| ITEM | SQUEALING SOUND PRESSURE LEVEL (MAXIMUM) | SQUEALING RATE (%) |
|---|---|---|
| Embodiment (1) | 0 dB | 0 |
| Embodiment (2) | 86 dB | 4 |
| Embodiment (3) | 0 dB | 0 |
| Comparative Embodiment (1) | 94 dB | 15 |
| Comparative Embodiment (2) | 97 dB | 20 |

WHAT IS MEANT BY SQUEALING RATE IS NUMBER OF BRAKE SQUEALING TO NUMBER OF BRAKING OF DISC BRAKE.

As described above, according to the present invention, a shim structure can be obtained, whose constitution is such that a rubber coating layer is formed on one side of a first constraint plate of a metallic plate and the like and a second constraint plate is stuck to the other side of the first constraint plate with a adhesive layer placed in-between, and wherein the ratio of the thickness of the fist constraint plate to a sum total thickness of the back plate of the disc brake pad of the automobile and the second constraint plate is taken as within a range of 0.1 to 0.2, and the second constraint plate is used so as to be brought into contact with the back plate so that the shim structure capable of preventing the squeal phenomenon at low temperatures can be obtained.

What is claimed is:

1. A vibration damping shim structure having a structure, wherein a rubber coating layer is formed on one side of a first constraint plate and a second constraint plate is stuck to the other side of the first constraint plate with an adhesive layer placed in-between, and wherein a ratio of the thickness of the first constraint plate to a sum total thickness of a back plate of a disc brake pad and the second constraint plate is within a range of 0.1 to 0.2 and the second constraint plate is brought into contact with the back plate.

2. The vibration damping shim structure according to claim 1, wherein a plurality of bubbles is contained in the adhesive layer.

3. The vibration damping shim structure according to claim 1, wherein the adhesive is an acryl pressure sensitive adhesive.

* * * * *